(12) United States Patent
Ho et al.

(10) Patent No.: US 10,593,492 B1
(45) Date of Patent: Mar. 17, 2020

(54) ILLUMINATING KEYBOARD AND LIGHT EMITTING MODULE THEREOF

(71) Applicant: CHICONY POWER TECHNOLOGY CO., LTD., New Taipei (TW)

(72) Inventors: Hsuan-Wei Ho, New Taipei (TW); Jian-Hua Huang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/420,568

(22) Filed: May 23, 2019

(30) Foreign Application Priority Data

Jan. 30, 2019 (TW) .............................. 108103570 A

(51) Int. Cl.
*H01H 13/83* (2006.01)
*G06F 3/02* (2006.01)

(52) U.S. Cl.
CPC ............ *H01H 13/83* (2013.01); *G06F 3/0202* (2013.01); *H01H 2219/018* (2013.01); *H01H 2219/036* (2013.01)

(58) Field of Classification Search
CPC ............. H01H 13/83; H01H 2219/036; H01H 2219/018; G06F 3/0202
See application file for complete search history.

(56) References Cited

U.S. PATENT DOCUMENTS 6,443,585 B1  9/2002  Saccomanno
9,563,281 B2  2/2017  Sellers 2008/0186736 A1*  8/2008  Rinko .................. G02B 6/0036
                                                       362/615
2011/0025727 A1   2/2011  Li et al.
2011/0278147 A1*  11/2011 Lee ......................... H01H 13/83
                                                       200/5 A
2014/0177198 A1*  6/2014  Hung ................... G02B 6/0036
                                                       362/23.03

(Continued)

FOREIGN PATENT DOCUMENTS

CN         201096910 Y    8/2008
CN         201262333 Y    6/2009
CN         100518207 C    7/2009

(Continued)

*Primary Examiner* — Kevin Quarterman
(74) *Attorney, Agent, or Firm* — Muncy, Geissler, Olds & Lowe, PC

(57) ABSTRACT

The present disclosure discloses an illuminating keyboard including a keyboard module and a light emitting module. The keyboard module has an opaque region. The light emitting module includes a light guiding plate, a first light emitting component and a second light emitting component. The light guiding plate includes an accommodating groove corresponding to the opaque region. The accommodating groove has a first sidewall, a second sidewall, a first light divergence segment and a second light divergence segment. The first light divergence segment and the second light divergence segment are disposed on the first sidewall and the second sidewall, respectively. The first light emitting component and the second light emitting component are located in the accommodating groove and are disposed toward the first sidewall and the second sidewall, respectively. The light beams are injected into the light guiding plate via the first and the second light divergence segment.

12 Claims, 7 Drawing Sheets

(56) References Cited

U.S. PATENT DOCUMENTS

2019/0371537 A1* 12/2019 Huang .................. H01H 3/125
2019/0371538 A1* 12/2019 Huang .................. H01H 3/125

FOREIGN PATENT DOCUMENTS

| CN | 202546503 U | 11/2012 |
| EP | 2629171 B1 | 11/2017 |
| TW | M482759 U | 7/2014 |
| TW | M525536 U | 7/2016 |

* cited by examiner

ILLUMINATING KEYBOARD AND LIGHT EMITTING MODULE THEREOF

BACKGROUND OF THE DISCLOSURE

1. Field of the Disclosure

The present disclosure relates to an illuminating keyboard; more particularly, relates to a light emitting module of an illuminating keyboard.

2. Description of the Related Art

In order to provide a light source with sufficient luminance for an illuminating keyboard, it is necessary to install a sufficient amount of light emitting components. Conventionally, multiple light emitting diodes (i.e., light emitting components) are disposed on a flexible circuit board, and the light emitting diodes along with the flexible circuit board are arranged in columns and placed on the middle of a light guiding plate which is the interlayer of an illuminating keyboard, such that the light emitted by the light emitting diodes can be uniformly spread to the periphery of the illuminating keyboard. However, it still requires at least 6 to 10 light emitting diodes to provide enough luminance and illuminance uniformity.

Furthermore, according to the development trends of consumer electronics, whether computers themselves or their peripheral electronic products are designed under the concept of lightweight, thin, compact and small, such that they would be convenient for users to carry around. However, with the design concept of lightweight, thin, compact and small, the accessible volume of the electronic product for interior functional modules is relatively narrowed down. Similarly, the current design concept of an illuminating keyboard is to shorten its length, width and thickness, which also narrows down the accommodation space for the light emitting components and the flexible circuit board. Therefore, there is a need to provide an illuminating keyboard and a light emitting module with fewer light emitting components but still achieving sufficient luminance and illuminance uniformity in order to mitigate and/or obviate the aforementioned problems.

SUMMARY OF THE DISCLOSURE

It is an object of the present disclosure to provide an illuminating keyboard and a light emitting module thereof, provided that a light guiding plate comprises an accommodating groove with a first light divergence segment and a second light divergence segment disposed therein, such that light beams emitted from a first light emitting component are injected into the light guiding plate via the first light divergence segment, and light beams emitted from a second light emitting component are injected into the light guiding plate via the second light divergence segment, so as to solve the problem by using only a few light emitting components to achieve sufficient luminance and illuminance uniformity.

To achieve the above-mentioned object, the present disclosure discloses an illuminating keyboard, which comprises a keyboard module and a light emitting module. The keyboard module has an opaque region. The light emitting module is correspondingly disposed to the keyboard module, and the light emitting module comprises a light guiding plate, a first light emitting component and a second light emitting component. The light guiding plate comprises a first surface, a second surface and an accommodating groove. The first surface is disposed toward the keyboard module. The second surface is located on an opposite side of the first surface. The accommodating groove is located between the first surface and the second surface, and corresponds to the opaque region. The accommodating groove includes a first sidewall, a second sidewall, a first light divergence segment and a second light divergence segment. The first light divergence segment is disposed on the first sidewall, and the second light divergence segment is disposed on the second sidewall. The first light emitting component is located in the accommodating groove and disposed toward the first sidewall. Light beams emitted from the first light emitting component are injected into the light guiding plate via the first light divergence segment. The second light emitting component is located in the accommodating groove and disposed toward the second sidewall. Light beams emitted from the second light emitting component are injected into the light guiding plate via the second light divergence segment.

To achieve the above-mentioned object, the disclosure further provides a light emitting module, which is applied in an illuminating keyboard. The illuminating keyboard comprises a keyboard module. The keyboard module has an opaque region. The light emitting module is correspondingly disposed to the keyboard module. The light emitting module comprises a light guiding plate, a first light emitting component and a second light emitting component. The light guiding plate comprises a first surface, a second surface and an accommodating groove. The first surface is disposed toward the keyboard module. The second surface is located on an opposite side of the first surface. The accommodating groove is located between the first surface and the second surface, and corresponds to the opaque region. The accommodating groove includes a first sidewall, a second sidewall, a first light divergence segment and a second light divergence segment. The first light divergence segment is disposed on the first sidewall, and the second light divergence segment is disposed on the second sidewall. The first light emitting component is located in the accommodating groove and disposed toward the first sidewall. Light beams emitted from the first light emitting component are injected into the light guiding plate via the first light divergence segment. The second light emitting component is located in the accommodating groove and disposed toward the second sidewall. Light beams emitted from the second light emitting component are injected into the light guiding plate via the second light divergence segment.

According to one embodiment of the present disclosure, the first light emitting has a first axis parallel to the first sidewall, and a first angle is formed between the first axis and a periphery of the light guiding plate. The second light emitting component has a second axis parallel to the second sidewall, and a second angle is formed between the second axis and the periphery of the light guiding plate. The first angle and the second angle increase as a maximal length of the light guiding plate increases.

According to one embodiment of the present disclosure, the shortest distance between the first light divergence segment and a periphery of the light guiding plate along a normal direction of the first light divergence segment is equal to the shortest distance between the second light divergence segment and the periphery of the light guiding plate along a normal direction of the second light divergence segment.

According to one embodiment of the present disclosure, the accommodating groove is located adjacent to the periphery of the light guiding plate.

According to one embodiment of the present disclosure, the accommodating groove further comprises an opening located on the periphery of the light guiding plate. The first light divergence segment and the second light divergence segment are disposed toward the opening.

According to one embodiment of the present disclosure, the first light divergence segment and the second light divergence segment are respectively formed by a plurality of convex portions which connect to each other. Each convex portion has at least two planes.

According to one embodiment of the present disclosure, each convex portion has two planes. A third angle is formed between the two planes, and the third angle is between 45 degrees to 120 degrees.

According to one embodiment of the present disclosure, the light guiding plate further comprises a division portion located between the first light divergence segment and the second light divergence segment.

According to one embodiment of the present disclosure, the light emitting module further comprises a reflection plate disposed on the second surface of the light guiding plate. The reflection plate has a first bend portion disposed to a periphery of the reflection plate.

According to one embodiment of the present disclosure, the light emitting module further comprises a light shielding plate disposed on the first surface of the light guiding plate. The light shielding plate has a second bend portion disposed to a periphery of the light shielding plate.

According to one embodiment of the present disclosure, the first bend portion of the reflection plate and the second bend portion of the light shielding plate jointly cover a periphery of the light guiding plate, and a reflection surface is provided on a side of the second bend portion which faces toward the light guiding plate.

As described above, according to the illuminating keyboard and the light emitting module of the present disclosure, a light guiding plate of the light emitting module includes an accommodating groove, wherein a first sidewall and a second sidewall of the accommodating groove are respectively disposed with a first light divergence segment and a second light divergence segment. Further, a first light emitting component is located in the accommodating groove and disposed toward the first sidewall, and a second light emitting component is located in the accommodating groove and disposed toward the second sidewall, such that light beams emitted from the first light emitting component and the second light emitting component can be injected into the light guiding plate via the first light divergence segment and the second light divergence segment, respectively. By means of using the first light divergence segment and the second light divergence segment to increase the divergence angle of the incident light beams, with only two light emitting components (i.e., the first light emitting component and the second light emitting component), the present disclosure can therefore spread the light beams uniformly to everywhere in the light guiding plate in order to provide sufficient luminance and illuminance uniformity.

Other objects, advantages, and novel features of the disclosure will become more apparent from the following detailed description when taken in conjunction with the accompanying drawings.

BRIEF DESCRIPTION OF THE DRAWINGS

These and other objects and advantages of the present disclosure will become apparent from the following description of the accompanying drawings, which disclose several embodiments of the present disclosure. It is to be understood that the drawings are to be used for purposes of illustration only, and not as a definition of the disclosure.

In the drawings, wherein similar reference numerals denote similar elements throughout the several views.

DETAILED DESCRIPTION OF THE PREFERRED EMBODIMENT

Figure 1:
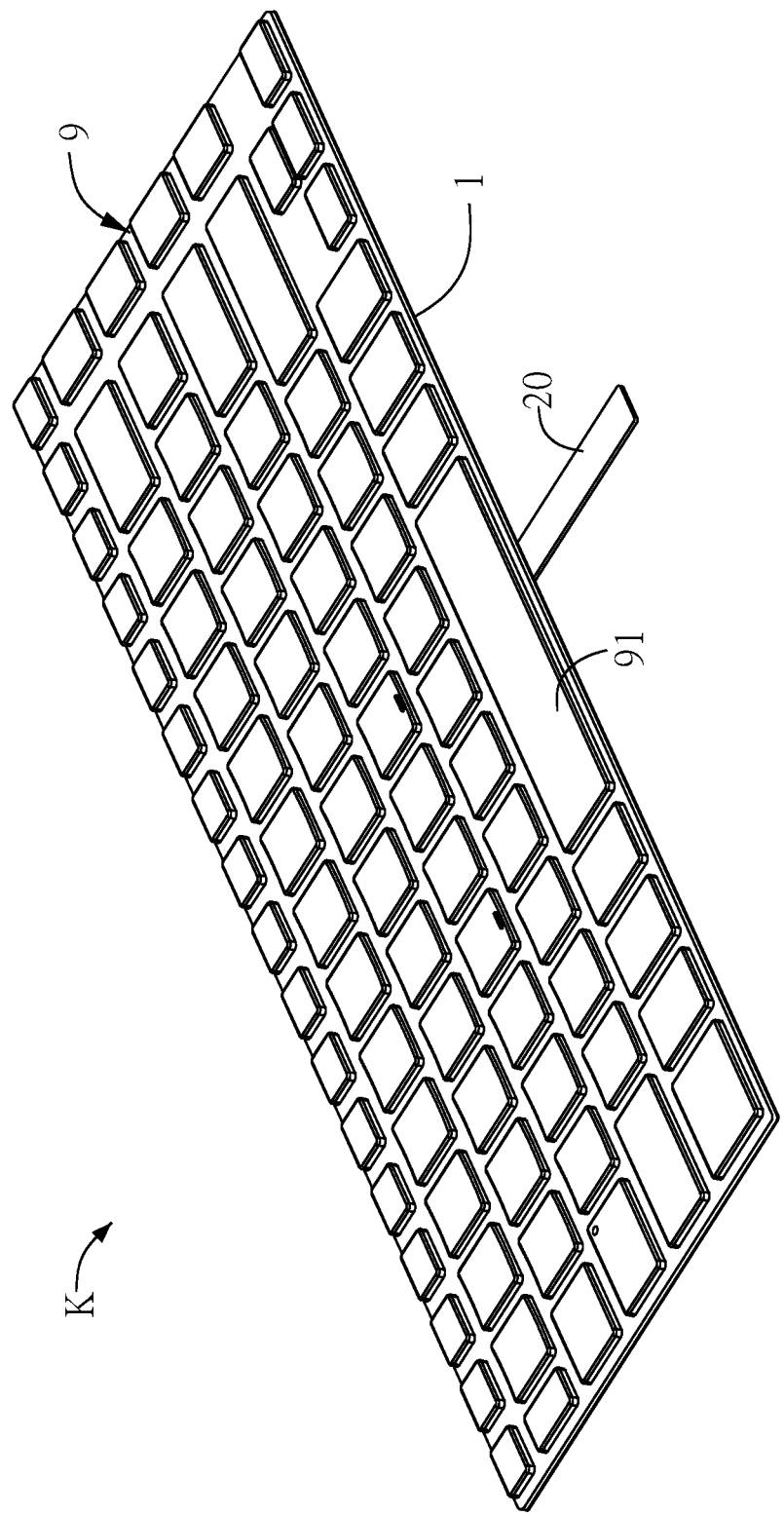
FIG. 1 illustrates a schematic drawing of an illuminating keyboard according to one embodiment of the present disclosure.
Figure 2:
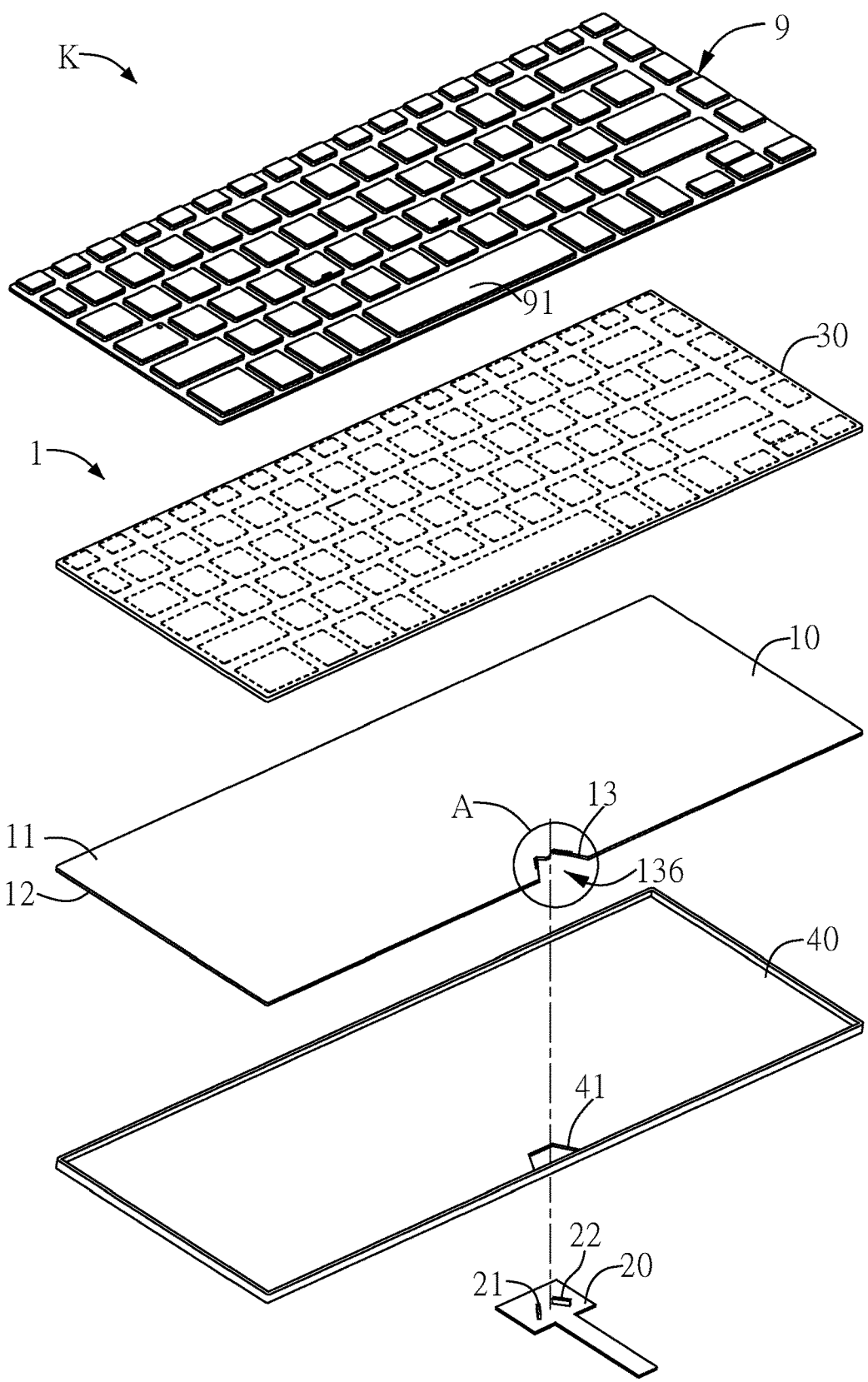
FIG. 2 illustrates an exploded schematic view of the illuminating keyboard as shown in FIG. 1.

Please refer to both FIG. 1 and FIG. 2. FIG. 1 illustrates a schematic drawing of an illuminating keyboard K according to one embodiment of the present disclosure; and FIG. 2 illustrates an exploded schematic view of the illuminating keyboard K as shown in FIG. 1. In this embodiment, the illuminating keyboard K comprises a light emitting module 1 and a keyboard module 9. The light emitting module 1 is correspondingly disposed to the keyboard module 9. In this embodiment, the light emitting module 1 is disposed to the bottom of the keyboard module 9. The light emitting module 1 comprises a light guiding plate 10, a circuit board 20, a first light emitting component 21, a second light emitting component 22, a light shielding plate 30 and a reflection plate 40. The light guiding plate 10 includes a first surface 11, a second surface 12 and an accommodating groove 13. According to the view angle of FIG. 2, the first surface 11 is the top surface of the light guiding plate 10, the first surface 11 is disposed toward the keyboard module 9, and the light shielding plate 30 is disposed on the first surface 11 of the light guiding plate 10. The second surface 12 is located on an opposite side of the first surface 11, which is the bottom surface of the light guiding plate 10. The reflection plate 40 is disposed on the second surface 12 of the light guiding plate 10. The light shielding plate 30 has a plurality of light transmission portions (illustrated in FIG. 2 as the dotted frames) respectively corresponding to each key of the keyboard module 9. Light beams emitted from the first light emitting component 21 and the second light emitting component 22 can penetrate through the light transmission portions to reach the back of the keys. If one of those keys has a character portion that allows light to transmit for indicating purposes, the light beams emitted from the first light emitting component 21 and the second light emitting component 22 can further penetrate through the character portion to achieve the effect of luminous key.

Further, the keyboard module 9 has an opaque region 91. Most of the keys of the keyboard module 9 have light-transmitting character portions, respectively. In this embodiment, the keys without the light-transmitting character portions are defined as the opaque region 91, such as, but not limited to, the space bar of a typical QWERTY keyboard. Because the surface area of the space bar is generally large, and does not need to have any light-transmitting character portion for indicating purposes, thus the space bar is suitable for serving as the opaque region 91 in this embodiment, but not limited to thereof. The accommodating groove 13 is located between the first surface 11 and the second surface 12, and corresponds to the opaque region 91. That is, the accommodating groove 13 is a hollowed structure feeding through the first surface 11 and the second surface 12. When the light emitting module 1 is disposed to the keyboard module 9, the location of the accommodating groove 13 would correspond to the opaque region 91 of the keyboard module 9. In this embodiment, the accommodating groove 13 is located adjacent to a periphery of the light guiding plate 10, and is near to the geometric centerline of the light guiding plate 10, so as to correspond to the opaque region 91 (which is the space bar in this embodiment) of the keyboard module 9.

The accommodating groove 13 of this embodiment has an opening 136 which is located on the periphery of the light guiding plate 10, that is, located on one of the side edges of the light guiding plate 10. By means of providing the opening 136, the light guiding plate 10 and the accommodating groove 13 in this embodiment can be made integrally through a mold. For example, the light guiding plate 10 and its accommodating groove 13 can be made integrally by using an etched steel mold. Further, the light guiding plate 10 and its accommodating groove 13 made by using the etched steel mold have cleaner and smoother surfaces, thus increasing effectiveness of light transmission of the light guiding plate 10. The conventional steel mold used for making a light guiding plate is engraved by a computer numerical control (CNC) machine, which would result in rougher surfaces of the light guiding plate and be unfavorable for the coupling efficiency while light beams enter the light guiding plate.

Figure 4:
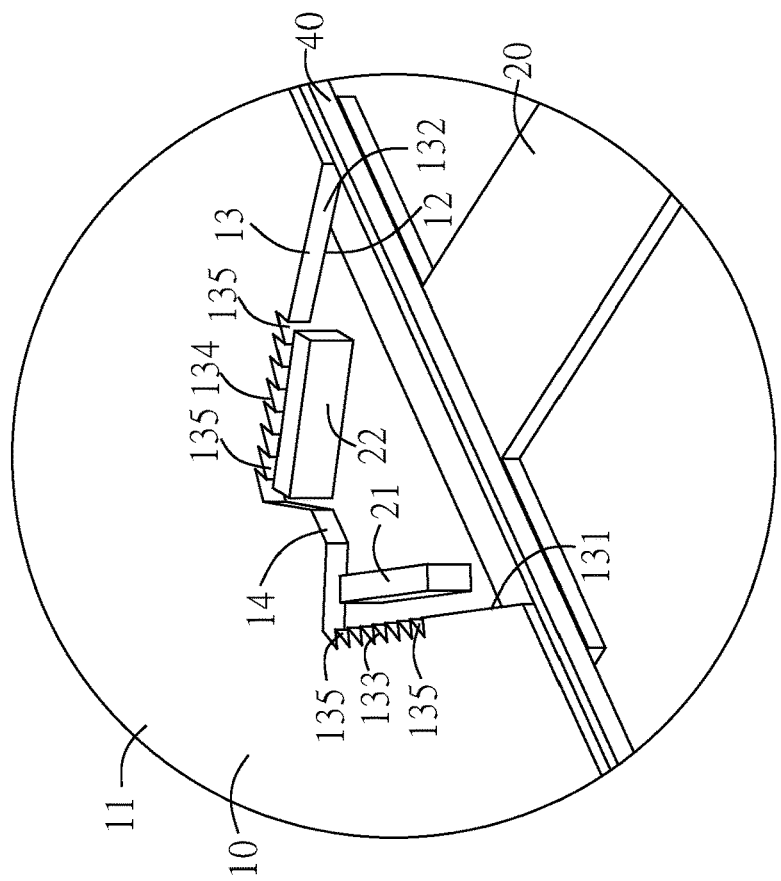
FIG. 4 illustrates a schematic drawing showing an accommodating groove as shown in FIG. 3 assembled with a reflection plate and a circuit board.

Moreover, the reflection plate 40 has a hole 41 correspondingly disposed to the accommodating groove 13 of the light guiding plate 10. The first light emitting component 21 and the second light emitting component 22 are disposed on the circuit board 20. The circuit board 20 is disposed on the bottom surface of the reflection plate 40. The first light emitting component 21 and the second light emitting component 22 pass through the hole 41 and are located in the accommodating groove 13 of the light guiding plate 10 (as shown in FIG. 4). Therefore, the locations of the first light emitting component 21 and the second light emitting component 22 also correspond to the opaque region 91 of the keyboard module 9, such that the light beams emitted from the first light emitting component 21 and the second light emitting component 22 can be uniformly guided by the light guiding plate 10 to reach everywhere beneath the keyboard module 9, in order to avoid strong leakage of light occurred above the locations of the first light emitting component 21 and the second light emitting component 22.

Figure 3:
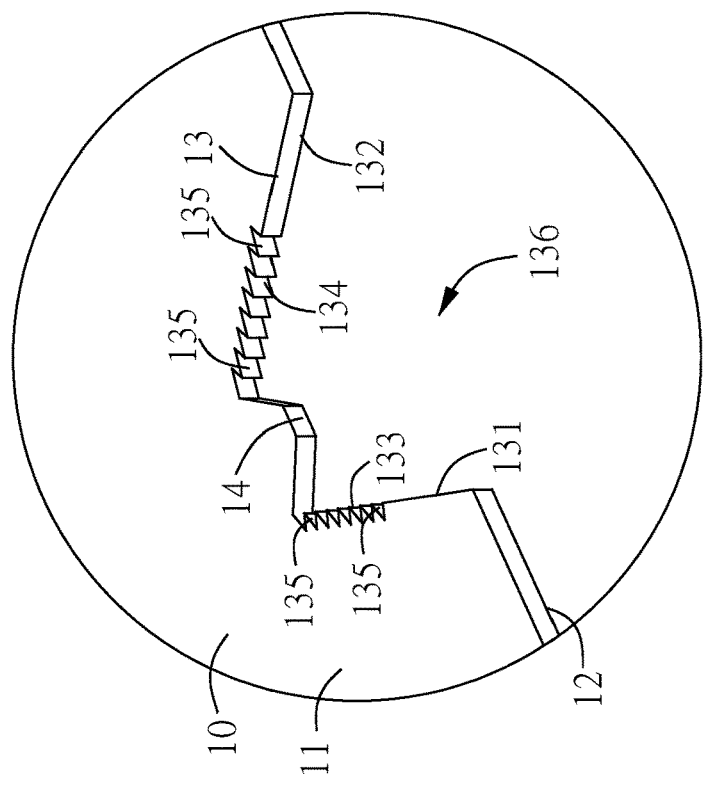
FIG. 3 illustrates an enlarged schematic drawing of a circle mark A as shown in FIG. 2.

Please refer to FIG. 3 and FIG. 4. FIG. 3 illustrates an enlarged schematic drawing of a circle mark A as shown in FIG. 2; and FIG. 4 illustrates a schematic drawing showing the accommodating groove 13 as shown in FIG. 3 assembled with the reflection plate 40 and the circuit board 20. In this embodiment, the accommodating groove 13 further includes a first sidewall 131, a second sidewall 132, a first light divergence segment 133 and a second light divergence segment 134. The first light divergence segment 133 is disposed on the first sidewall 131, the second light divergence segment 134 is disposed on the second sidewall 132, and both the first light divergence segment 133 and the second light divergence segment 134 are disposed toward the opening 136. The first light emitting component 21 is located in the accommodating groove 13 and disposed toward the first sidewall 131. That is, a light emitting surface of the first light emitting component 21 faces toward the first sidewall 131, such that the light beams emitted from the first light emitting component 21 are injected into the light guiding plate 10 via the first light divergence segment 133. Similarly, the second light emitting component 22 is located in the accommodating groove 13 and disposed toward the second sidewall 132, such that a light emitting surface of the second light emitting component 22 faces toward the second sidewall 132, and therefore the light beams emitted from the second light emitting component 22 are injected into the light guiding plate 10 via the second light divergence segment 134.

Figure 5:
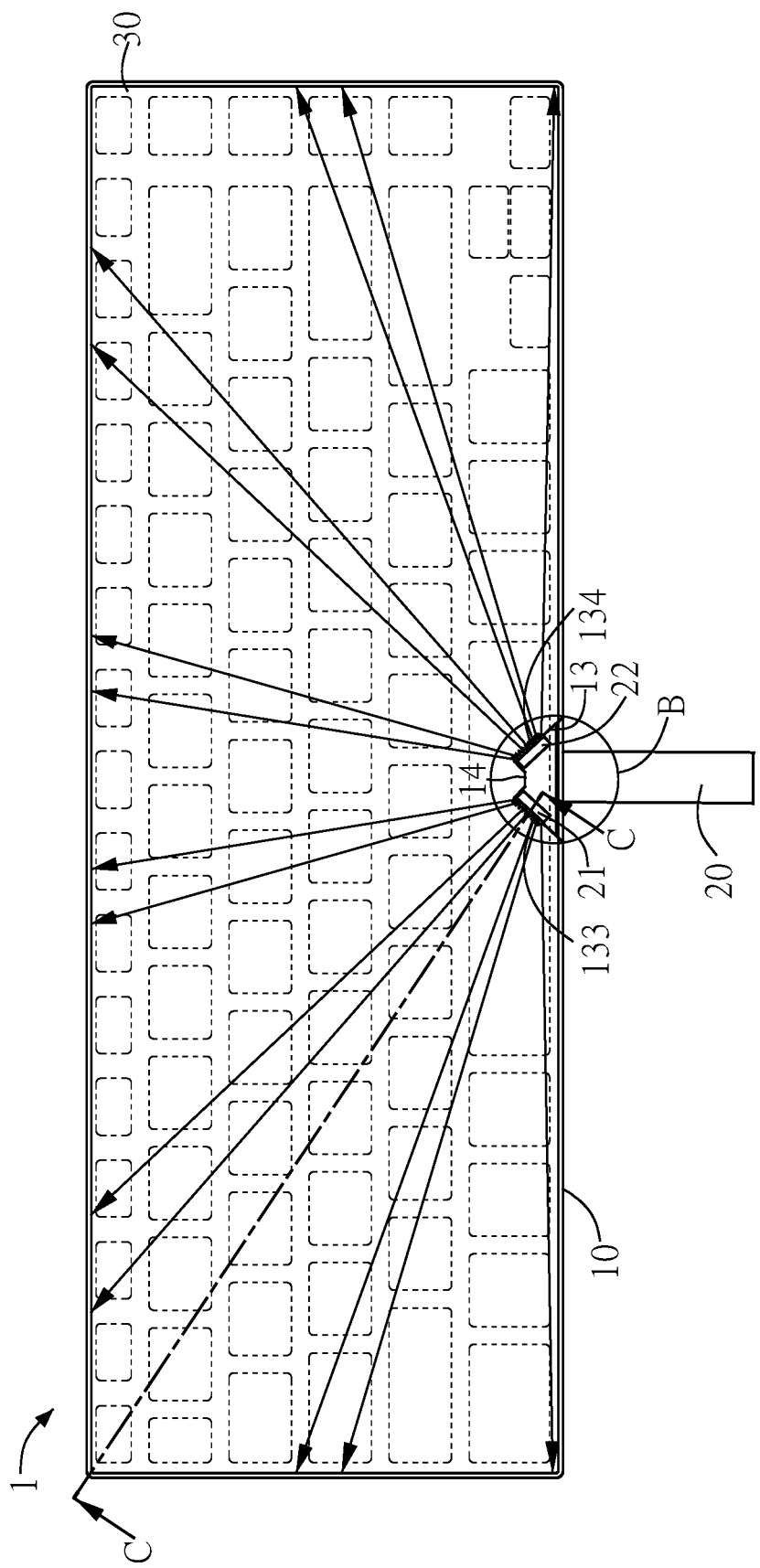
FIG. 5 illustrates a schematic top view of a light emitting module as shown in FIG. 1.
Figure 6:
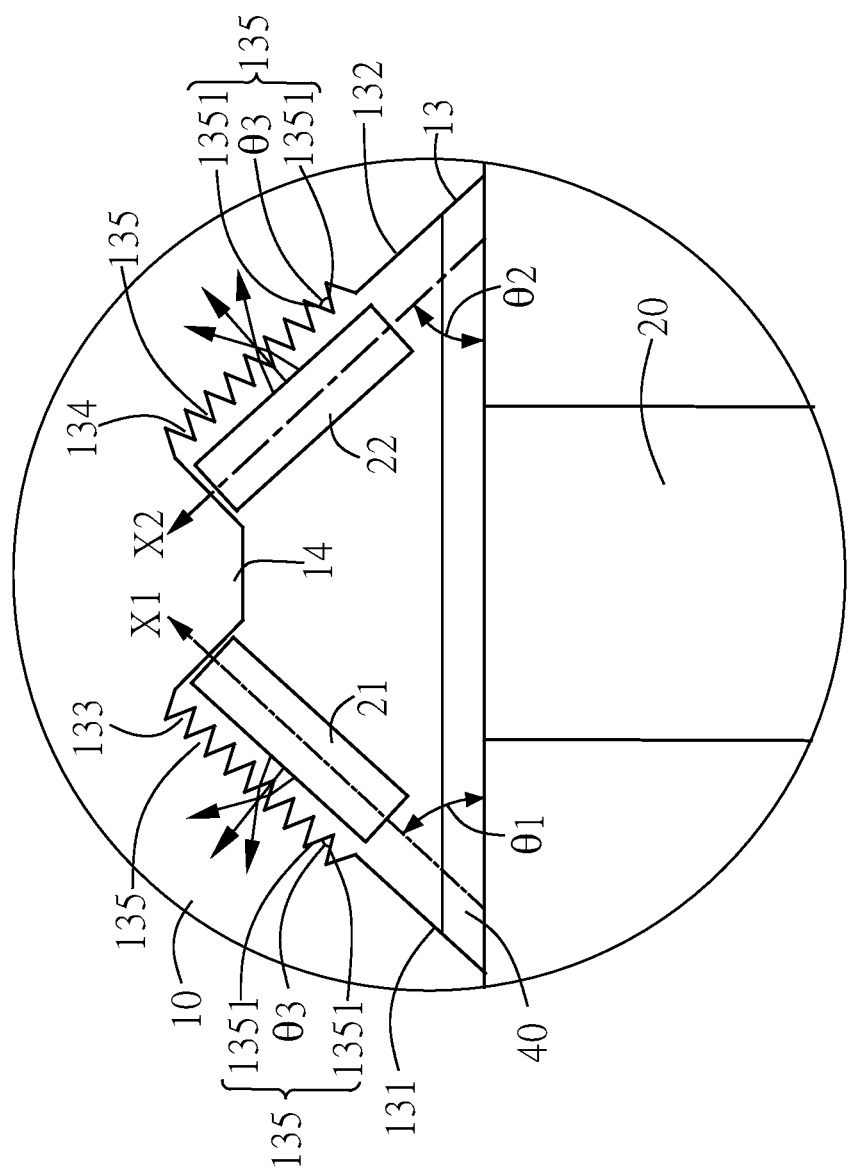
FIG. 6 illustrates an enlarged schematic drawing of a circle mark B as shown in FIG. 5.

FIG. 5 illustrates a schematic top view of the light emitting module 1 as shown in FIG. 1; and FIG. 6 illustrates an enlarged schematic drawing of a circle mark B as shown in FIG. 5. In this embodiment, FIG. 5 and FIG. 6 are provided for describing how the first light divergence segment 133 and the second light divergence segment 134 of the light guiding plate 10 respectively guide the light beams emitted from the first light emitting component 21 and the second light emitting component 22, therefore the keyboard module 9 is illustrated as dotted lines in FIG. 5 and FIG. 6. Please refer to FIG. 4, FIG. 5 and FIG. 6, the first light divergence segment 133 and the second light divergence segment 134 are the structures to diverge the light beams. In this embodiment, the first light divergence segment 133 and the second light divergence segment 134 are respectively formed by a plurality of convex portions 135 which connect to each other. Each convex portion 135 has at least two planes 1351. For example, the convex portion 135 can be in the shape of a triangle pillar, a trapezoid pillar or other type of pillar structure that has at least two planes. In this embodiment, the convex portion 135 is in the shape of a triangle pillar, such that the first light divergence segment 133 and the second light divergence segment 134 respectively constitute zigzag-like structures in their entireties.

As shown in FIG. 6, a divergence angle of the light beams that are injected into the light guiding plate 10 can be increased according to the planes 1351 which are arranged in different angles. For example, the light beams injected into the light guiding plate 10 from the plane 1351 of the convex portion 135 would generate different refraction angles due to refraction, so as to increase the divergence angle of the incident light beams. If the light beams are injected into the first sidewall 131 or the second sidewall 132 with flat planes, the divergence angle of the light beams being injected into the light guiding plate 10 is typically between 100 degrees and 120 degrees. In this embodiment, after the light beams emitted from the first light emitting component 21 and the second light emitting component 22 are respectively injected into the light guiding plate 10 via the first light divergence segment 133 and the second light divergence segment 134, the divergence angle presented by the light beams is between 140 degrees and 170 degrees. Therefore, with only two light emitting components (i.e., the first light emitting component 21 and the second light emitting component 22), the light emitting module 1 in this embodiment can spread the light beams uniformly to everywhere in the light guiding plate 10 and can further provide the entire keyboard module 9 with sufficient luminance.

As shown in FIG. 6, each convex portion 135 of the first light divergence segment 133 and the second light divergence segment 134 is in the shape of a triangle pillar, and a third angle θ3 is formed between each two planes 1351. Preferably, the third angle θ3 is between 45 degrees and 120 degrees. In other embodiments, if the convex portion 135 is in the shape of a trapezoid pillar, a third angle θ3 is formed between the extensions of two opposite planes, and the third angle θ3 is preferably, without limiting the scope of the present disclosure, between 45 degrees and 120 degrees.

Figure 7:
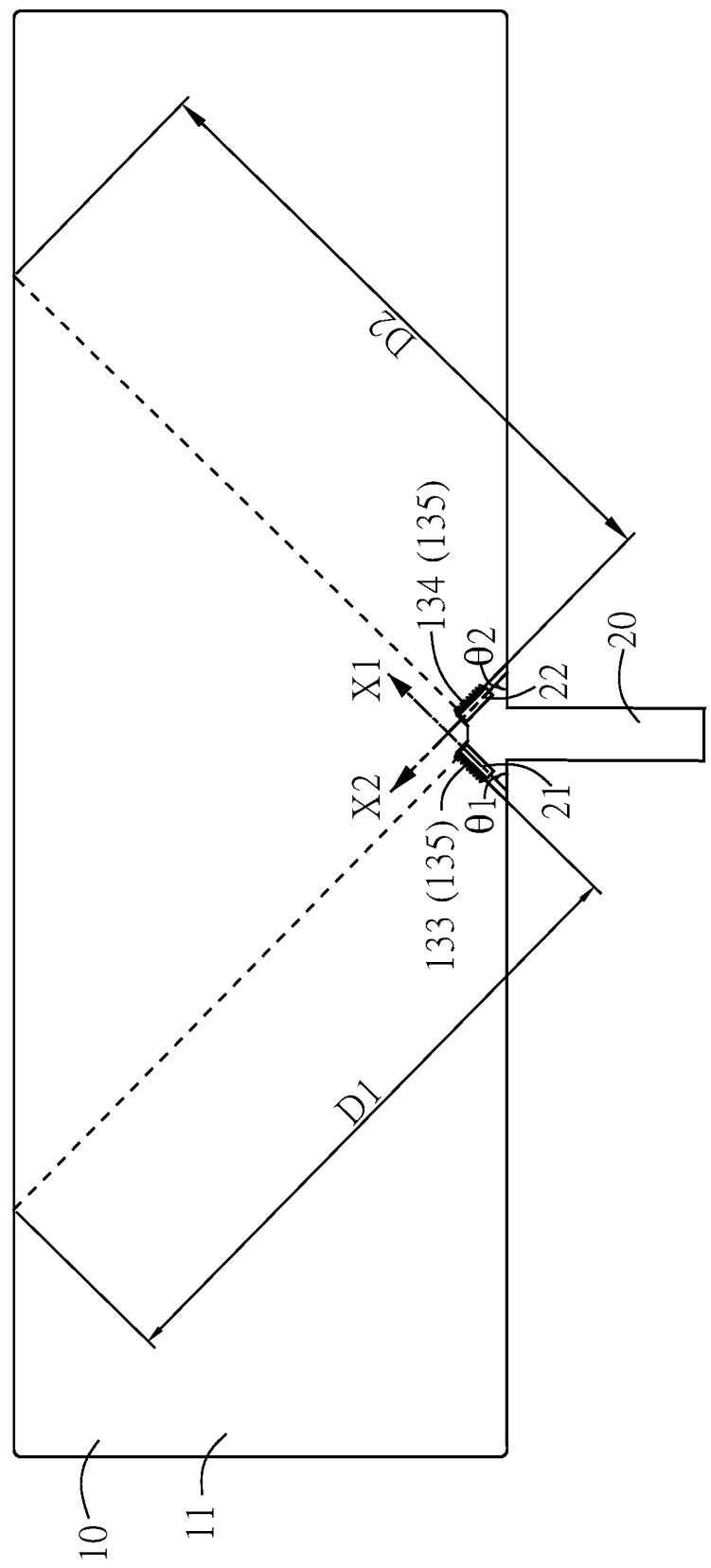
FIG. 7 illustrates a schematic drawing of a light guiding plate, a first light emitting component and a second light emitting component as shown in FIG. 5.

Further, the placement angle of the first light emitting component 21 and the second light emitting component 22 can be adjusted according to a maximal length (typically viewed as a long edge of a rectangle) of the light guiding plate 10 or the keyboard module 9. FIG. 7 illustrates a schematic drawing of the light guiding plate 10, the first light emitting component 21 and the second light emitting component 22 as shown in FIG. 5. Please refer to both FIG. 6 and FIG. 7. The first light emitting component 21 has a first axis X1 parallel to the first sidewall 131, and a first angle θ1 is formed between the first axis X1 and the periphery of the light guiding plate 10. The second light emitting component 22 has a second axis X2 parallel to the second sidewall 132, and a second angle θ2 is formed between the second axis X2 and the periphery of the light guiding plate 10. Please note that in this embodiment, the periphery of the light guiding plate 10 refers to the rectangular contour of the light guiding plate 10, therefore the first axis X1 and the second axis X2 would intersect with two side edges of the light guiding plate 10 as shown in FIG. 7. More precisely, in this embodiment, because the accommodating groove 13 corresponds to the space bar of the keyboard module 9, the first axis X1 and the second axis X2 would intersect with the side edge located at the bottom of the light guiding plate 10. Furthermore, the first angle θ1 and the second angle θ2 refer to the acute angles.

For example, if the size of the light guiding plate 10 is 230 mm in length (i.e., the long edge of the rectangle) and 80 mm in width (i.e., the short edge of the rectangle), the first angle θ1 and the second angle θ2 are preferably 45 degrees, respectively. If the size of the light guiding plate 10 is 300 mm in length and 105 mm in width, the first angle θ1 and the second angle θ2 are preferably 53 degrees, respectively. If the size of the light guiding plate 10 is 400 mm in length and 120 mm in width, the first angle θ1 and the second angle θ2 are preferably 60 degrees, respectively. Therefore, the first angle θ1 and the second angle θ2 would increase as the maximal length (i.e., the length of the long edge of the rectangular contour of the light guiding plate 10) of the light guiding plate 10 increases. Preferably, the first angle θ1 and the second angle θ2 are between 45 degrees and 60 degrees, respectively.

As shown in FIG. 6 and FIG. 7, the accommodating groove 13 in this embodiment is located on the bottom of the light guiding plate 10 and is located on the geometric centerline of the light guiding plate 10, such that the shortest distance D1 between the first light divergence segment 133 and the periphery of the light guiding plate 10 along a normal direction of the first light divergence segment 133 (i.e., a direction which is perpendicular to the extension direction of the first light divergence segment 133) is equal to the shortest distance D2 between the second light divergence segment 134 and the periphery of the light guiding plate 10 along a normal direction of the second light divergence segment 134. That is, an imaginary line connecting the front tips of the convex portions 135 of the first light divergence segment 133 is used as a reference (which also can be viewed as using the extension direction of the first sidewall 131 as the reference in this embodiment) to mark the shortest distance D1 between the first light divergence segment 133 and one side edge of the light guiding plate 10; an imaginary line connecting the front tips of the convex portions 135 of the second light divergence segment 134 is used as another reference (which also can be viewed as using the extension direction of the second sidewall 132 as the another reference in this embodiment) to mark the shortest distance D2 between the second light divergence segment 134 and that side edge of the light guiding plate 10. Because the accommodating groove 13 is located on another side edge (i.e., the bottom) of the light guiding plate 10 and is located on the geometric centerline of the light guiding plate 10, the shortest distance D1 is equal to the shortest distance D2, and the first angle θ1 is equal to the second angle θ2. In other embodiments, if the opaque region 91 of the keyboard module 9 differs from the above-mentioned embodiment, the accommodating groove 13 may also be disposed away from the geometric centerline of the light guiding plate 10, and the first angle θ1 is not necessarily equal to the second angle θ2 (as such, the shortest distance D1 and the shortest distance D2 are no longer equal). Please note that the scope of the present disclosure is not limited to the above description.

Preferably, please refer to FIG. 3, FIG. 4 and FIG. 6. The light guiding plate 10 further comprises a division portion 14 located between the first light divergence segment 133 and the second light divergence segment 134. If the first light divergence segment 133 and the second light divergence segment 134 are disposed adjacent to each other without the division portion 14, the incident light beams which are injected into the first light divergence segment 133 and the second light divergence segment 134 would overlap in the intermediate area of the light guiding plate 10 between the first light divergence segment 133 and the second light divergence segment 134, and thus result in excessive concentration of light (i.e., illuminance nonuniformity). By means of providing the division portion 14, the overlap of light beams being injected into the first light divergence segment 133 and the second light divergence segment 134 can be reduced.

Figure 8:
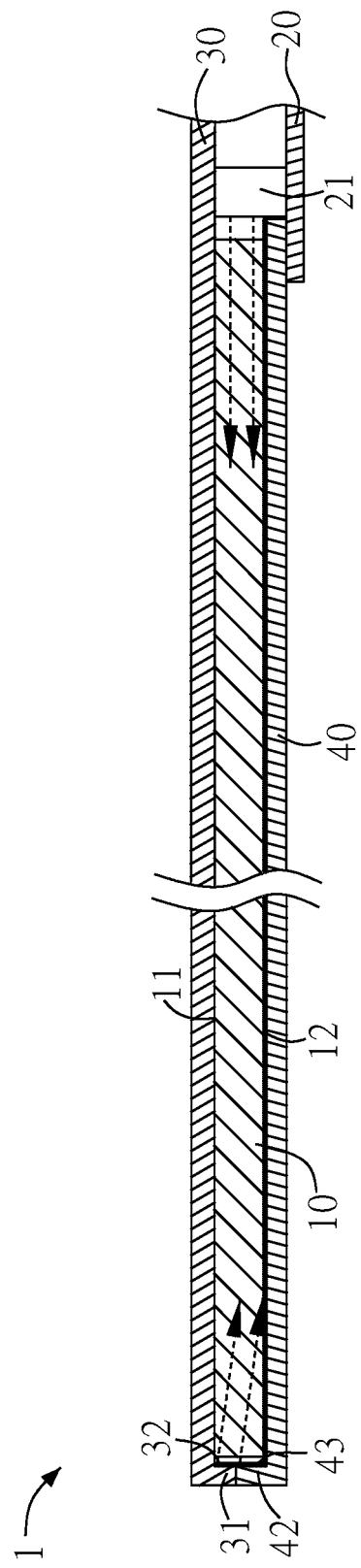
FIG. 8 illustrates a C-C cross-sectional schematic drawing of the light emitting module as shown in FIG. 5.

Please refer to FIG. 8, which illustrates a C-C cross-sectional schematic drawing of the light emitting module 1 as shown in FIG. 5. The reflection plate 40 in this embodiment has a first bend portion 42 disposed to the periphery of the reflection plate 40. Preferably, all four side edges of the rectangular reflection plate 40 can be disposed with the first bend portion 42, but not limited to thereof. Further, the first bend portion 42 is bent toward the light guiding plate 10 and partly covers the periphery of the light guiding plate 10. Further, because a reflection surface 43 is provided on the side (which is the upper surface in this embodiment) of the reflection plate 40 facing toward the light guiding plate 10, while the first bend portion 42 is formed by bending the periphery of the reflection plate 40 toward the light guiding plate 10, a part of the reflection surface 43 adjacent to the periphery of the reflection plate 40 would also face toward the light guiding plate 10.

In this embodiment, the light shielding plate 30 has a second bend portion 31 disposed to the periphery of the light shielding plate 30. Similarly, all four side edges of the rectangular light shielding plate 30 can be disposed with the second bend portion 31, but not limited to thereof. Further, the second bend portion 31 is bent toward the light guiding plate 10, such that the first bend portion 42 of the reflection plate 40 and the second bend portion 31 of the light shielding plate 30 would jointly cover the periphery of the light guiding plate 10. In this embodiment, a reflection layer can be applied to the side of the second bend portion 31 that faces toward the light guiding plate 10 for being served as a reflection surface 32. By means of utilizing the first bend portion 42 and the second bend portion 31 to jointly cover the periphery of the light guiding plate 10, as well as the design that the reflection surfaces 43,32 are provided on the sides of the first bend portion 42 and the second bend portion 31 facing toward the light guiding plate 10, the effectiveness of preventing the periphery of the light guiding plate 10 from leaking light out and fully utilizing the energy of light source is achieved. In other embodiments, the effectiveness of prevention of light leakage can also be achieved by utilizing only the first bend portion 42 of the reflection plate 40 to entirely cover the periphery of the light guiding plate 10, or by utilizing only the second bend portion 31 of the light shielding plate 30 to entirely cover the periphery of the light guiding plate 10.

As described above, according to the illuminating keyboard and the light emitting module of the present disclosure, a light guiding plate of the light emitting module includes an accommodating groove, wherein a first sidewall and a second sidewall of the accommodating groove are respectively disposed with a first light divergence segment and a second light divergence segment. Further, a first light emitting component is located in the accommodating groove and disposed toward the first sidewall, and a second light emitting component is located in the accommodating groove and disposed toward the second sidewall, such that light beams emitted from the first light emitting component and the second light emitting component can be injected into the light guiding plate via the first light divergence segment and the second light divergence segment, respectively. By means of using the first light divergence segment and the second light divergence segment to increase the divergence angle of the incident light beams, with only two light emitting components (i.e., the first light emitting component and the second light emitting component), the present disclosure can therefore spread the light beams uniformly to everywhere in the light guiding plate in order to provide sufficient luminance and illuminance uniformity for the keyboard module of the illuminating keyboard.

Although the present disclosure has been explained in relation to its preferred embodiments, it is to be understood that many other possible modifications and variations can be made without departing from the spirit and scope of the disclosure as hereinafter claimed.

What is claimed is:

1. An illuminating keyboard, comprising:
   a keyboard module, having an opaque region; and
   a light emitting module, correspondingly disposed to the keyboard module, the light emitting module comprising:
      a light guiding plate, comprising:
         a first surface, disposed toward the keyboard module;
         a second surface, located on an opposite side of the first surface; and
         an accommodating groove, located between the first surface and the second surface and corresponding to the opaque region, the accommodating groove including a first sidewall, a second sidewall, a first light divergence segment and a second light divergence segment, wherein the first light divergence segment is disposed on the first sidewall, and the second light divergence segment is disposed on the second sidewall;
      a first light emitting component, located in the accommodating groove and disposed toward the first sidewall, wherein light beams emitted from the first light emitting component are injected into the light guiding plate via the first light divergence segment; and
      a second light emitting component, located in the accommodating groove and disposed toward the second sidewall, wherein light beams emitted from the second light emitting component are injected into the light guiding plate via the second light divergence segment.

2. The illuminating keyboard as claimed in claim 1, wherein the first light emitting component has a first axis parallel to the first sidewall, a first angle is formed between the first axis and a periphery of the light guiding plate, the second light emitting component has a second axis parallel to the second sidewall, and a second angle is formed between the second axis and the periphery of the light guiding plate, where the first angle and the second angle increase as a maximal length of the light guiding plate increases.

3. The illuminating keyboard as claimed in claim 1, wherein the shortest distance between the first light divergence segment and a periphery of the light guiding plate along a normal direction of the first light divergence segment is equal to the shortest distance between the second light divergence segment and the periphery of the light guiding plate along a normal direction of the second light divergence segment.

4. The illuminating keyboard as claimed in claim 3, wherein the accommodating groove is located adjacent to the periphery of the light guiding plate.

5. The illuminating keyboard as claimed in claim 4, wherein the accommodating groove further comprises an opening located on the periphery of the light guiding plate, and the first light divergence segment and the second light divergence segment are disposed toward the opening.

6. The illuminating keyboard as claimed in claim 1, wherein the first light divergence segment and the second light divergence segment are respectively formed by a plurality of convex portions which connect to each other, and each convex portion has at least two planes.

7. The illuminating keyboard as claimed in claim 6, wherein each convex portion has two planes, and a third angle which is between 45 degrees and 120 degrees is formed between the two planes.

8. The illuminating keyboard as claimed in claim 1, wherein the light guiding plate further comprises a division portion located between the first light divergence segment and the second light divergence segment.

9. The illuminating keyboard as claimed in claim 1, wherein the light emitting module further comprises a reflection plate disposed on the second surface of the light guiding plate, and the reflection plate has a first bend portion disposed to a periphery of the reflection plate.

10. The illuminating keyboard as claimed in claim 9, wherein the light emitting module further comprises a light shielding plate disposed on the first surface of the light guiding plate, and the light shielding plate has a second bend portion disposed to a periphery of the light shielding plate.

11. The illuminating keyboard as claimed in claim 10, wherein the first bend portion of the reflection plate and the second bend portion of the light shielding plate jointly cover a periphery of the light guiding plate, and a reflection surface is provided on a side of the second bend portion which faces toward the light guiding plate.

12. A light emitting module, applied in an illuminating keyboard, the illuminating keyboard comprising a keyboard module, the keyboard module having an opaque region, the light emitting module being correspondingly disposed to the keyboard module, the light emitting module comprising:
- a light guiding plate, comprising:
  - a first surface, disposed toward the keyboard module;
  - a second surface, located on an opposite side of the first surface; and
  - an accommodating groove, located between the first surface and the second surface and corresponding to the opaque region, the accommodating groove including a first sidewall, a second sidewall, a first light divergence segment and a second light divergence segment, wherein the first light divergence segment is disposed on the first sidewall, and the second light divergence segment is disposed on the second sidewall;
- a first light emitting component, located in the accommodating groove and disposed toward the first sidewall, wherein light beams emitted from the first light emitting component are injected into the light guiding plate via the first light divergence segment; and
- a second light emitting component, located in the accommodating groove and disposed toward the second sidewall, wherein light beams emitted from the second light emitting component are injected into the light guiding plate via the second light divergence segment.

* * * * *